(12) United States Patent
Norem et al.

(10) Patent No.: US 8,585,536 B2
(45) Date of Patent: Nov. 19, 2013

(54) GEAR CARRIER FRAME

(75) Inventors: Dean A. Norem, Cherry Valley, IL (US); Daniel Miller, West Lafayette, IN (US); Jeffrey Berger, Zionsville, IN (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 0 days.

(21) Appl. No.: 13/437,335

(22) Filed: Apr. 2, 2012

(65) Prior Publication Data

US 2013/0260951 A1 Oct. 3, 2013

(51) Int. Cl.
*F16H 57/08* (2006.01)

(52) U.S. Cl.
USPC .......................................................... 475/331

(58) Field of Classification Search
USPC .......................................................... 475/331
See application file for complete search history.

(56) References Cited

U.S. PATENT DOCUMENTS

| | | | |
|---|---|---|---|
| 3,527,121 A * | 9/1970 | Moore | 475/338 |
| 3,939,736 A * | 2/1976 | Morin | 475/338 |
| 5,102,379 A | 4/1992 | Pagluica et al. | |
| 5,466,198 A | 11/1995 | McKibbin et al. | |
| 5,472,383 A | 12/1995 | McKibbin | |
| 5,472,386 A | 12/1995 | Kish | |
| 5,910,066 A | 6/1999 | Schulz et al. | |
| 6,986,726 B2 * | 1/2006 | Simon | 475/340 |
| 7,033,301 B2 * | 4/2006 | Kimes | 475/340 |
| 7,404,779 B2 | 7/2008 | Eckert | |
| 7,824,305 B2 | 11/2010 | Duong et al. | |
| 8,187,141 B2 * | 5/2012 | Goleski et al. | 475/331 |
| 2007/0225111 A1 | 9/2007 | Duong et al. | |
| 2009/0293278 A1 | 12/2009 | Duong et al. | |
| 2011/0105270 A1 * | 5/2011 | Matsuoka et al. | 475/331 |
| 2011/0130246 A1 | 6/2011 | McCune et al. | |

FOREIGN PATENT DOCUMENTS

| | | |
|---|---|---|
| DE | 2855545 B1 | 4/1980 |
| DE | 102007011895 A1 | 9/2008 |
| DE | 102010032252 A1 | 1/2012 |
| EP | 1703174 A1 | 9/2006 |
| WO | 2007003306 A1 | 1/2007 |

OTHER PUBLICATIONS

Extended European Search Report for corresponding Application No. 13162018.9-1752, dated Jun. 17, 2013; 6 pgs.

* cited by examiner

*Primary Examiner* — David D Le
*Assistant Examiner* — David J Hlavka
(74) *Attorney, Agent, or Firm* — Cantor Colburn LLP

(57) ABSTRACT

A planetary gear assembly includes a sun gear, planetary gears engaging the sun gear, a ring gear arranged about the planetary gears, the ring gear engaging the planetary gears, and a carrier frame including one or more pairs of bearing containment bands, a plurality of connecting segments, a plurality of spoke portions, and a hub portion, wherein each pair of bearing containment bands is connected to an adjacent pair of bearing containment bands with a connecting segment of the plurality of connecting segments and a spoke portion of the plurality of spoke portions connects each connecting segment to the hub portion.

16 Claims, 6 Drawing Sheets

GEAR CARRIER FRAME

BACKGROUND OF THE INVENTION

The present invention is related to reduction gears and, in particular, to a carrier frame used in a planetary gear system.

Gear reductions are often used in mechanical systems to provide a differential in the rates of rotation of an input shaft and an output shaft. Planetary gear assemblies are one example of such a reduction gear system.

Planetary gear assemblies may include, for example, an input shaft having a sun gear arranged coaxially with an axis of rotation of the input shaft. Planetary gears engage the sun gear in a radial arrangement about the sun gear, and engage a fixed ring gear that is concentrically arranged about the sun gear. The planetary gears are arranged between the sun gear and the ring gear. The planetary gears are supported by bearings (generally two per gear, or two bearing sets) that are mounted in a carrier frame. These bearings are arranged in two planes with a bearing supporting each end of the planetary gear at each of these two planes. These planes are commonly arranged such that one is on either side of the gear so that the gear is straddle mounted (where gear face load occurs between bearings). The bearing centers are closely aligned between the two planes to establish an axis of rotation about their center that is parallel to the axis of rotation of the sun gear.

In operation, a torsional force applied to the input shaft rotates the sun gear, which in turn, rotates the planetary gears that are coupled to the carrier frame resulting in the rotation of the carrier frame, and an output shaft connected to the carrier frame. The tooth count of each of the gears used collectively establishes the specific reduction ratio of the planetary gear assembly.

BRIEF DESCRIPTION OF THE INVENTION

According to an exemplary embodiment of the present invention, a planetary gear assembly includes a sun gear, planetary gears engaging the sun gear, a ring gear arranged about the planetary gears, the ring gear engaging the planetary gears, and a carrier frame including one or more pairs of bearing containment bands, a plurality of connecting segments, a plurality of spoke portions, and a hub portion, wherein each pair of bearing containment bands is connected to an adjacent pair of bearing containment bands with a connecting segment of the plurality of connecting segments and a spoke portion of the plurality of spoke portions connects each connecting segment to the hub portion.

According to yet another exemplary embodiment of the present invention, a carrier frame of a planetary gear assembly, the carrier frame including one or more pairs of bearing containment bands, a plurality of connecting segments, a plurality of spoke portions, and a hub portion, wherein each pair of bearing containment bands is connected to an adjacent pair of bearing containment bands with a connecting segment of the plurality of connecting segments and a spoke portion of the plurality of spoke portions connects each connecting segment to the hub portion.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
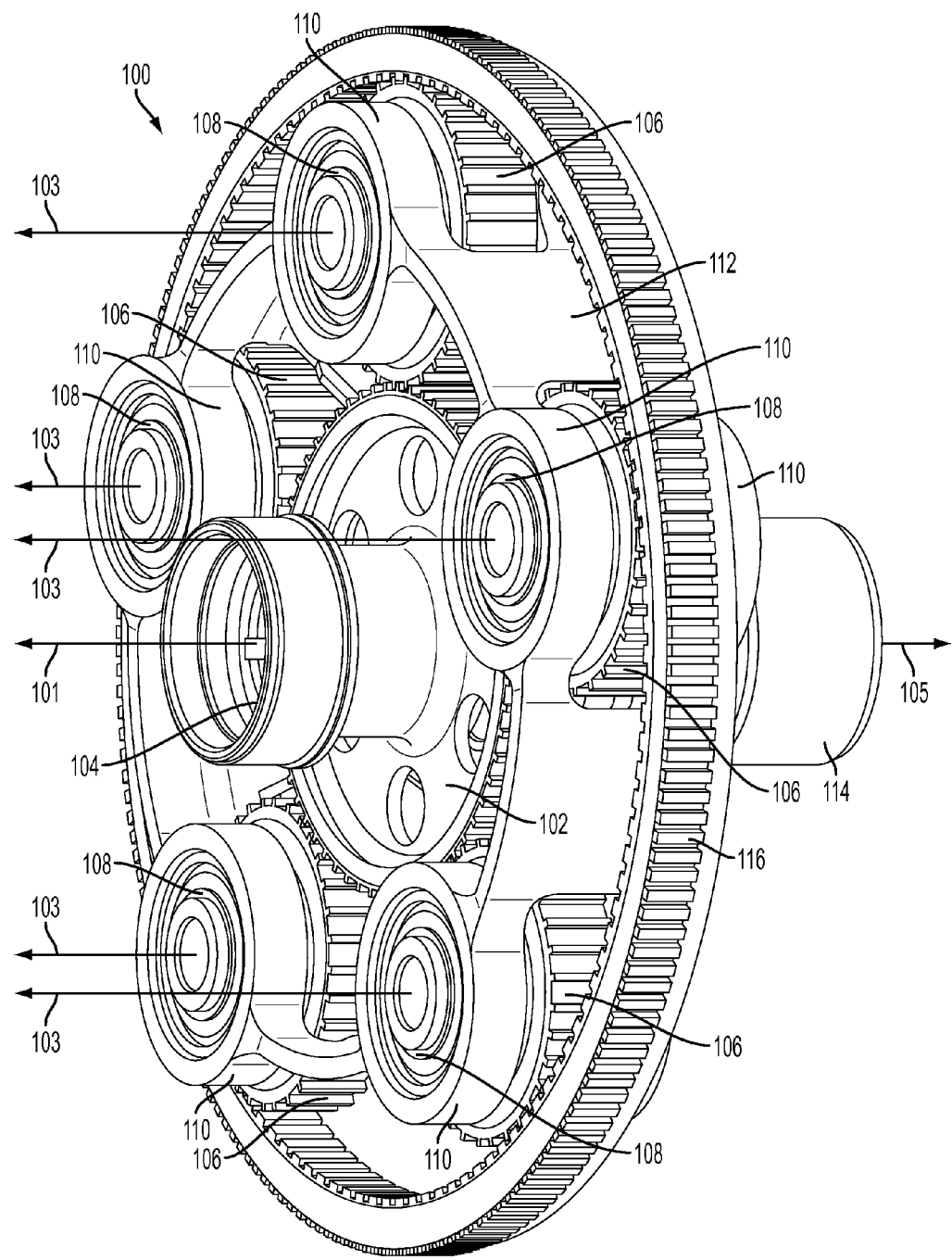
FIG. 1 illustrates a perspective view of an exemplary embodiment of a planetary gear assembly.

FIG. 1 illustrates a perspective view of an exemplary embodiment of a planetary gear assembly 100. The planetary gear assembly 100 includes a sun gear portion 102 coupled to an input shaft 104. Planetary gears 106 engage the sun gear 102, and are arranged radially about the sun gear 102. The planetary gears 106 are coupled to bearings 108 that engage bearing containment bands 110 of a carrier frame 112. The carrier frame 112 is connected to an output shaft 114. An outer ring gear 116 engages the planetary gears 106 and is arranged concentrically about the sun gear 102.

In operation, the outer ring gear 116 may be fixed in position to, for example a housing portion (not shown). The input shaft 104 may be coupled to a device that provides a torque force such as, for example, an engine. When torque is applied to the input shaft 104, the sun gear 102 rotates about the axis of rotation indicated by the arrow 101. The rotation of the sun gear 102 in turn, drives the engaged planetary gears 106 such that the planetary gears 106 rotate about their respective axes of rotation indicated by the arrows 103. The axes of rotation 103 of the planetary gears 106 are arranged substantially in parallel with the axis of rotation 101 of the sun gear 102. The fixed arrangement of the outer ring gear 116 in engagement with the rotating planetary gears 106 results in the rotation of the carrier frame 112, the output shaft 114, and the collectively supported planetary gears 106 about an axis of rotation (indicated by the arrow 105) that is substantially coaxial with the axis of rotation indicated by the arrow 101.

In previous examples of carrier frames, a torque was applied to the input shaft, the resulting applied force is transmitted from the sun gear, to the planet gears, thru the bearing pairs, and onto the carrier frames. One plane of the bearings was coincident with the principle supporting plate, but the opposing plane of bearings were effectively moment loads (loads applied at a distance), which resulted in non-uniform torsional deflection of the carrier frame, creating misalignment of one bearing on a shaft relative to the other bearing. The illustrated exemplary embodiments of the carrier frame 112 described herein provide a carrier frame 112 that results in symmetric moment loading from bearings onto the carrier, which then exhibits uniform torsional deflection between bearing pairs when a torque is applied to the input shaft 104. This outcome preserves suitable alignments between the bearing pairs supporting the planet gears, and thereby improving bearing life. The illustrated exemplary embodiments also requires less structural material and may be lighter than previous examples, thus providing additional benefits by reducing the amount of material resources used, and minimizing the total weight of the carrier frame.

Figure 2:
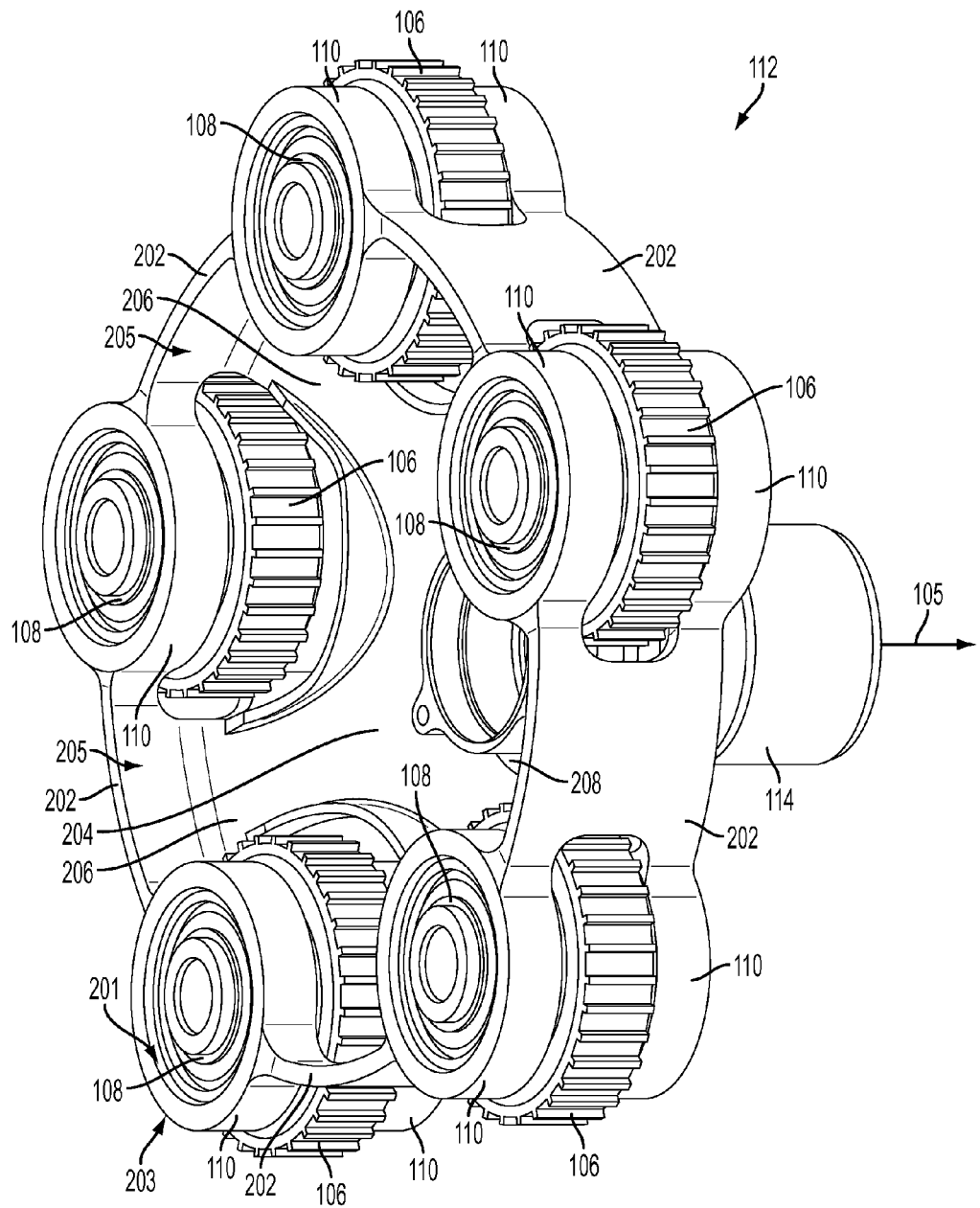
FIG. 2 illustrates a perspective view of the carrier frame, the planetary gears, and the supporting bearings of the gear assembly of FIG. 1.

FIG. 2 illustrates a perspective view of the carrier frame 112, the bearings 108 and the planetary gears 106. The bearings 108 engage bearing containment bands 110 of the carrier frame 112. The bearing containment bands 110 of the illustrated embodiment define an inner surface 201 and an outer surface 203. The inner surface 201 defines an inner diameter that corresponds to an outer diameter of the bearings 108. The outer surface 203 of each of the bearing containment bands 110 is connected to an adjacent outer surface 203 of a bearing wrap portion 110 by connecting segments 202. A hub portion 204 having a conical profile includes connecting spokes 206 that extend radially from a portion 208 that connects to the output shaft 114 to connect to an inner surface 205 of the connecting segments 202. The curved profile of the conical hub portion 204 facilitates clearance for the sun gear 102 (of FIG. 1) such that the hub portion 204 and spokes 206 do not interfere with the rotation of the sun gear 102 or the engagement of the sun gear 102 with the planetary gears 106. In the illustrated embodiment, the carrier frame 112 is fabricated from a single piece of material such as, for example, steel, titanium, or aluminum. However, in alternate embodiments the carrier frame 112 may be fabricated from any number of separate components. The output shaft 114 is presented in this embodiment as being integrally formed with the carrier frame 112, however alternate embodiments may provide a carrier frame 112 having a coupling or fastening portion operative to engage the output shaft 114. The terms input shaft 104 and output shaft 114 are used for illustrative purposes. One of ordinary skill in the art would understand that an input force may be applied to either the input shaft 104 or output shaft 114 and, thus, the function of the respective shafts are interchangeable, and the terms input shaft 104 or output shaft 114 do not limit the functions of the shafts.

Figure 3:
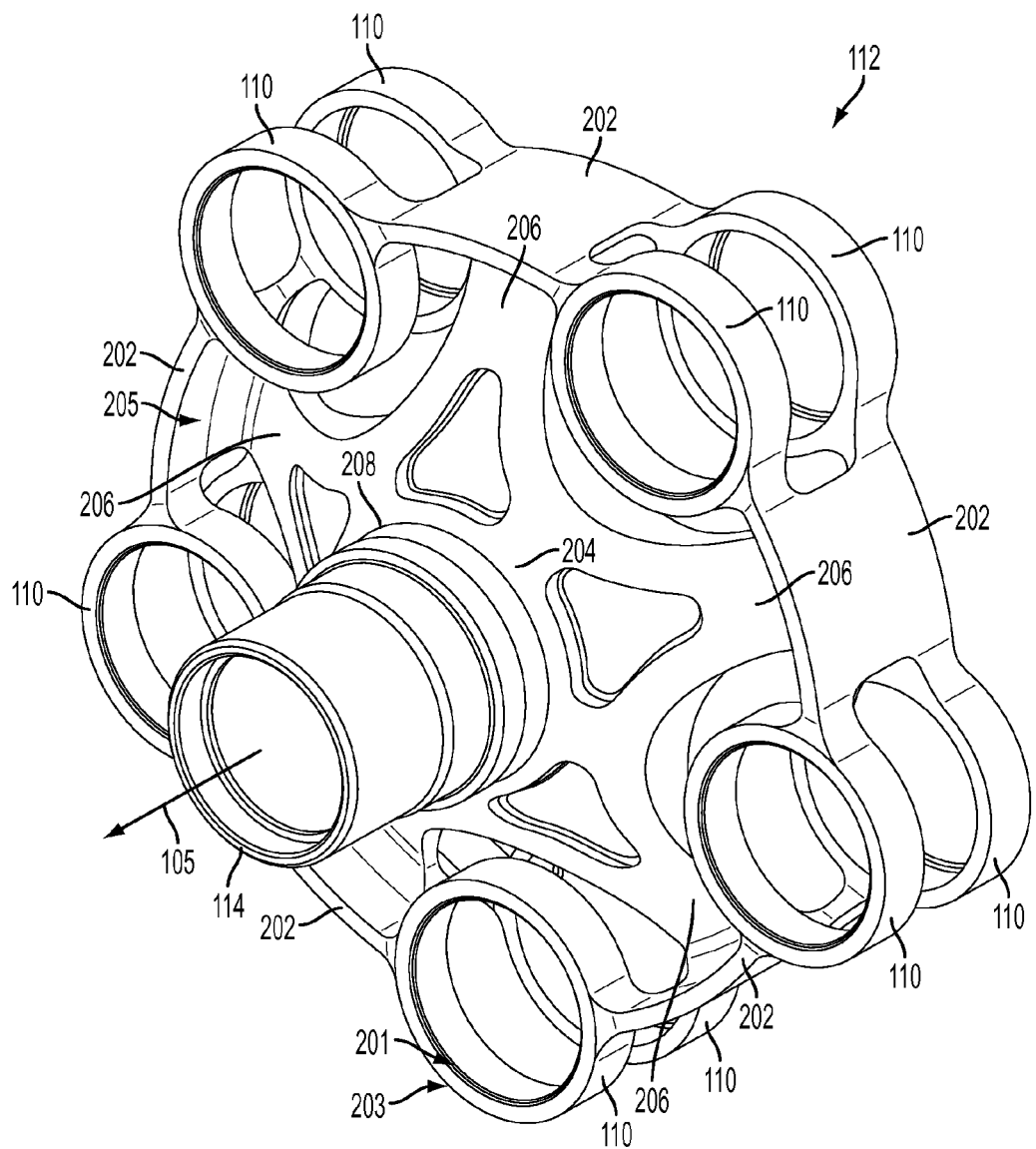
FIG. 3 illustrates a perspective view of an exemplary embodiment of the carrier frame of FIGS. 1 and 2.
Figure 4:
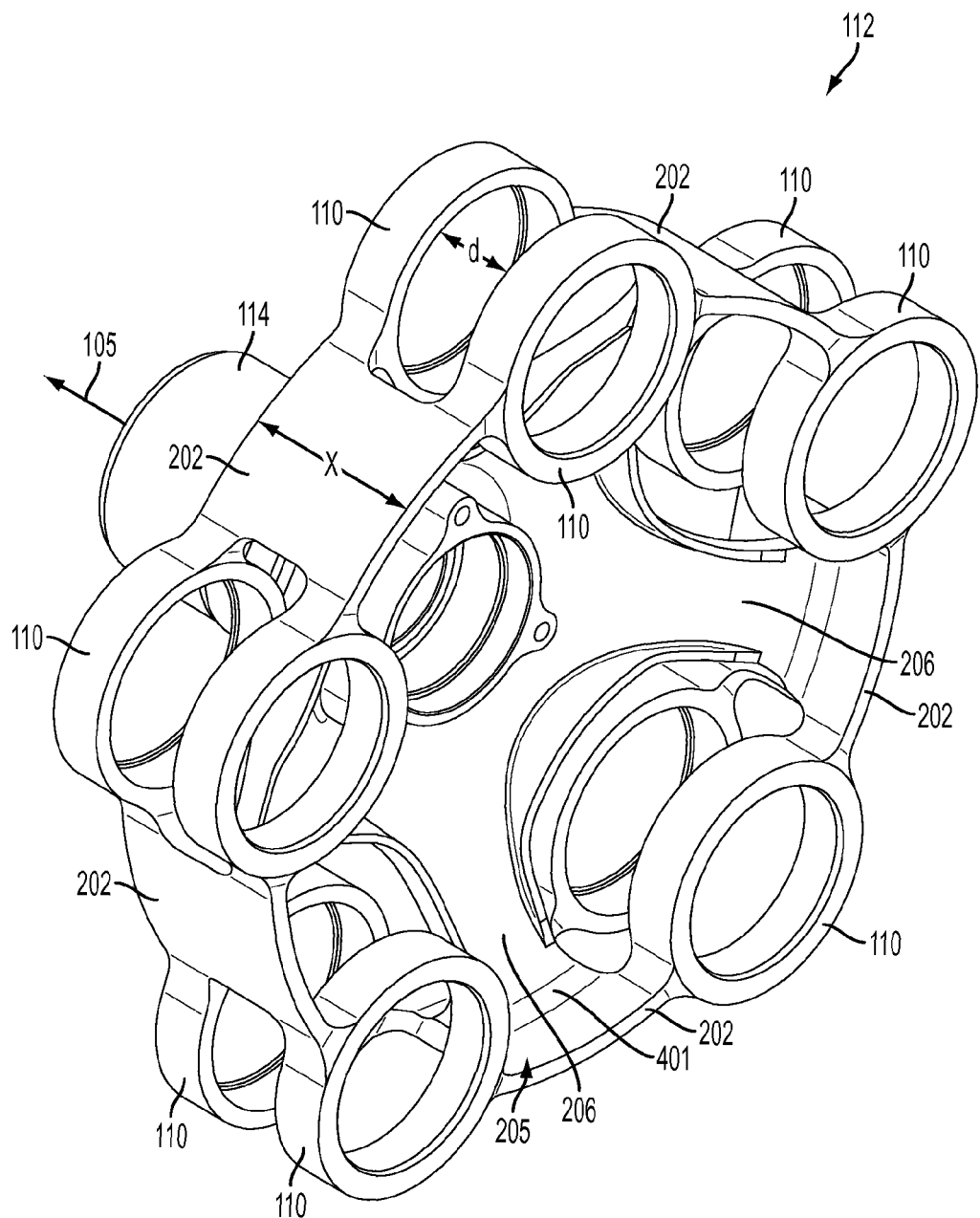
FIG. 4 illustrates another perspective view of the carrier frame of FIG. 3.

FIG. 3 illustrates a perspective view of an exemplary embodiment of the carrier frame 112 of FIGS. 1 and 2. FIG. 4 illustrates another perspective view of the carrier frame 112 of FIG. 3. Referring to FIG. 4, the bearing containment bands 110 are arranged in pairs that are spaced a distance d along a line that is substantially parallel to the axis of rotation indicated by the arrow 105. The connecting segments 202 define a dimension x that is substantially parallel to the axis of rotation indicated by the arrow 105. In the illustrated embodiment the distal ends 401 of the spokes 206 intersect and are connected to the inner surface 205 of corresponding connecting segments 202 at approximately the mid point of the dimension x. The positions of the intersections of the distal ends 401 of the spokes 206 with the connecting arc segment 202 affects the torsional deflection of the carrier frame 112 when a bearing reaction force is applied to the bearing containment bands 110 via the planetary gears 106 and bearings 108 (of FIG. 1). Though in the illustrated embodiment, the intersections of the distal ends 401 of the spokes 206 with the connecting segment 202 is arranged at approximately the mid point of the dimension x, alternate embodiments may arrange the intersections of the distal ends 401 of the spokes 206 with the connecting segment 202 in any position relative to the dimension x to optimize the reduction of torsional deflection of the carrier frame 112 when a force is applied to the bearing containment bands 110 via the planetary gears 106. For example, it may be desirable to locate the intersections of the distal ends 401 of the spokes 206 with the connecting arc segment 202 in line, or substantially coplanar with the gear mesh plane (or center of the gear faces). In this regard, the intersection point may be determined based on system geometry, applied loads, and design goals for the carrier frame 112.

Figure 5:
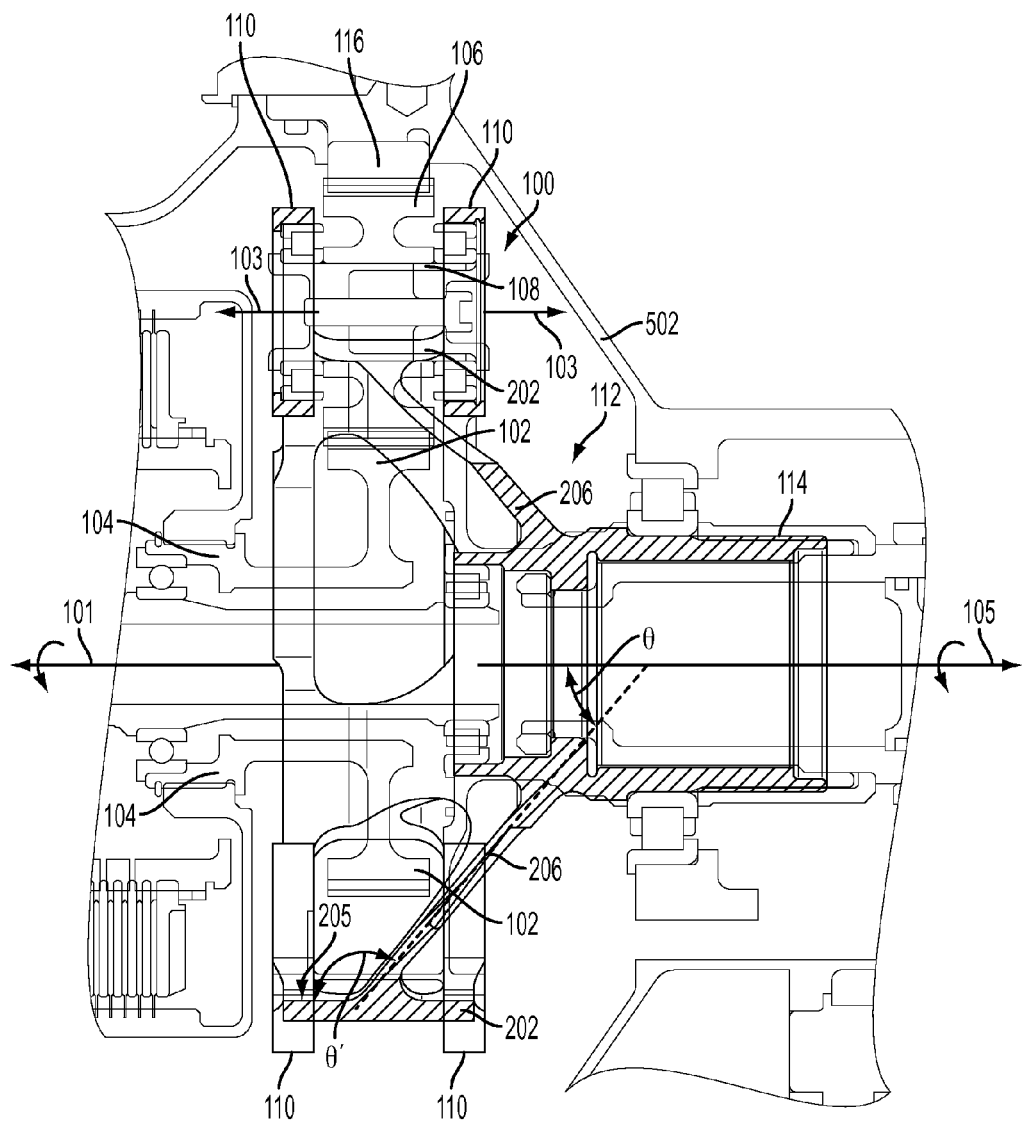
FIG. 5 illustrates a section view (side partially cut away) of the planetary gear frame arranged within an exemplary embodiment of a housing portion and gear train.

FIG. 5 illustrates a side partially cut away view of the presented planetary gear assembly 100 arranged in an exemplary embodiment of a housing portion 502. In this regard, the outer ring gear 116 is secured to the housing portion 502. The spokes 206 define an angle θ relative to the axis of rotation of the carrier frame 112 as indicated by the arrow 105. The spokes 206 also define an angle θ' relative to the inner surface of the 205 of the connecting segments 202. In this illustrated embodiment, these angles are approximately supplements, though curvature of the connecting conical surface subtly influences the relationship between the angles. However, the connecting segments 202 may facilitate at any angle θ' based on system packaging, production methods, operating loads, and tolerable deflection levels.

Figure 6:
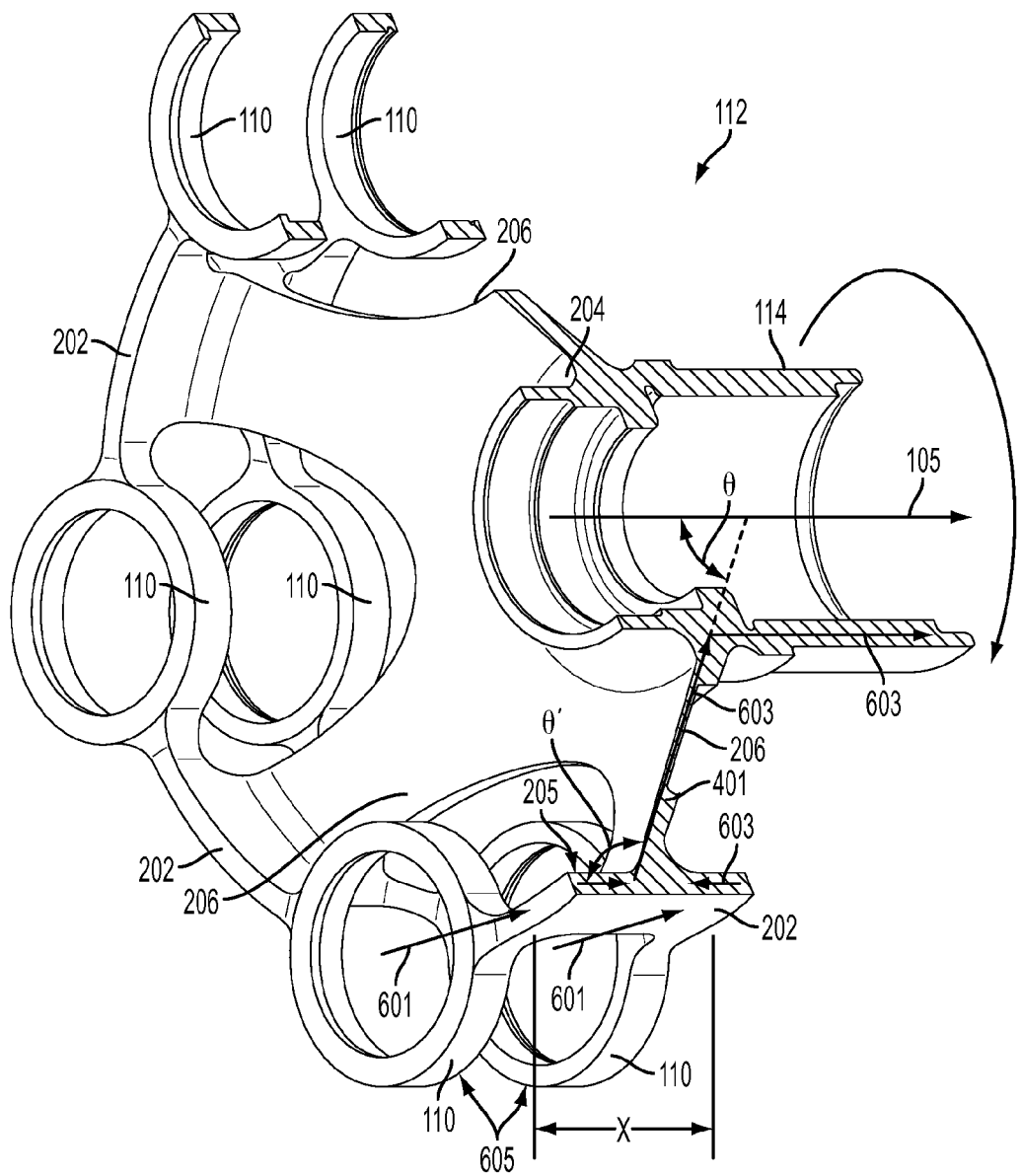
FIG. 6 illustrates a perspective partially cut-away view of the carrier frame.

FIG. 6 illustrates a perspective partially cut-away view of the carrier frame 102. When a load is applied to the carrier frame 114 via the planetary gears 106 (of FIG. 1), the bearing reaction force is directed as indicated by the arrows 601 into the bearing containment bands 110. The arrows 603 illustrate the structural path of the forces toward the output shaft 114 via the connecting segments 202 and the spokes 206 of the hub portion 204. The arrangement of the intersections of the distal ends 401 of the spokes 206 with the connecting segment 202 at approximately the mid point of the dimension x provides equalized torsional deflection of the carrier frame 112 and improved planet bearing alignments when the force is applied as indicated by the arrows 601. As discussed above, the intersections of the distal ends 401 of the spokes 206 with the connecting segment 202 may be arranged at any point along the dimension x (relative to the spacing of the bearing containment bands 110 in each of the pairs of bearing containment bands 110) to optimize the reduction of the torsional deflection of the carrier frame 112. Thus, the relative torsional deflection of the carrier frame 112 can be influenced (e.g., balanced or equalized) if the intersections of the distal ends 401 of the spokes 206 with the connecting segment 202 are arranged, for example, in another position that is not equidistant from the planes defined by the surfaces 605 of the bearing containment bands 110.

Though the illustrated embodiments include a planetary gear assembly having five planetary gears, alternate embodiments may include a plurality of planetary gears having any number of planetary gears.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A planetary gear assembly including:
a sun gear defining a first axis of rotation;
planetary gears engaging the sun gear;
a ring gear arranged about the planetary gears, the ring gear engaging the planetary gears; and
a carrier frame including one or more pairs of bearing containment bands, a plurality of connecting segments, a plurality of spoke portions, and a hub portion, wherein each pair of bearing containment bands is connected to an adjacent pair of bearing containment bands with a connecting segment of the plurality of connecting segments and a spoke portion of the plurality of spoke portions connects each connecting segment to the hub portion, wherein the carrier frame defines a second axis of rotation, wherein the spoke portion intersects the hub portion and defines an oblique angle defined by a portion of the spoke portion and the second axis of rotation.

2. The assembly of claim 1, wherein the spoke portion defines a curved profile.

3. The assembly of claim 1, wherein the spoke portion intersects the connecting segment at a point substantially equidistant between the bearing containment bands of a pair of bearing containment bands.

4. The assembly of claim 1, wherein the carrier frame is arranged about the sun gear.

5. The assembly of claim 1, wherein the assembly further includes pairs of bearings, each pair of bearings supporting a planetary gear, shaft, each pair of bearings engaging a pair of the bearing containment bands.

6. The assembly of claim 1, further comprising a first shaft connected to the sun gear.

7. The assembly of claim 6, further comprising a second shaft connected to the carrier frame.

8. The assembly of claim 1, further comprising a housing portion connected to the ring gear.

9. The assembly of claim 1, wherein each of the planetary gears defines respective axes of rotation, whereby the rotational axis of each of the planetary gears are parallel to the first axis of rotation.

10. The assembly of claim 1, wherein the second axis of rotation is substantially coaxial with the first axis of rotation.

11. The assembly of claim 1, wherein the ring gear is arranged concentric with the sun gear.

12. The assembly of claim 9, wherein the spoke portion intersects the connecting segment and defines an oblique angle defined by a portion of the spoke portion and the axis of rotation of the planetary gears.

13. The assembly of claim 1, wherein the carrier frame is a unitary and continuous structure formed from a substantially uniform material.

14. A carrier frame of a planetary gear assembly, the carrier frame including one or more pairs of bearing containment bands, a plurality of connecting segments, a plurality of spoke portions, and a hub portion, wherein each pair of bearing containment bands is connected to an adjacent pair of bearing containment bands with a connecting segment of the plurality of connecting segments and a spoke portion of the plurality of spoke portions connects each connecting segment to the hub portion, wherein the spoke portion intersects the hub portion and defines an oblique angle defined by a portion of the spoke portion and an axis of rotation of the carrier frame.

15. The carrier frame of claim 14, wherein the spoke portion intersects the connecting segment at a point substantially equidistant between the bearing containment bands of a pair of bearing containment bands.

16. The assembly of claim 14, wherein the carrier frame is a unitary and continuous structure formed from a substantially uniform material.

* * * * *